US012576700B2

(12) United States Patent
Kovie

(10) Patent No.: US 12,576,700 B2
(45) Date of Patent: Mar. 17, 2026

(54) RETRACTABLE SHIELDS FOR VEHICLE TAILGATES

(71) Applicant: Nissan North America, Inc., Franklin, TN (US)

(72) Inventor: David Kovie, Livonia, MI (US)

(73) Assignee: Nissan North America, Inc., Franklin, TN (US)

( * ) Notice: Subject to any disclaimer, the term of this patent is extended or adjusted under 35 U.S.C. 154(b) by 494 days.

(21) Appl. No.: 18/172,574

(22) Filed: Feb. 22, 2023

(65) Prior Publication Data

US 2024/0278628 A1 Aug. 22, 2024

(51) Int. Cl.
B60J 5/10 (2006.01)
B60J 9/00 (2006.01)

(52) U.S. Cl.
CPC ...... B60J 5/107 (2013.01); B60J 9/00 (2013.01)

(58) Field of Classification Search
CPC . B60J 5/0494; B60J 5/101; B60J 5/107; B60J 11/00
USPC ......................................... 296/56, 152, 154
See application file for complete search history.

(56) References Cited

U.S. PATENT DOCUMENTS

| | | | |
|---|---|---|---|
| 4,201,412 A | 5/1980 | Williams et al. | |
| 5,186,511 A * | 2/1993 | Hwang | B60J 1/20 296/154 |
| 6,811,207 B2 * | 11/2004 | Dalpizzol | B60J 5/101 135/88.01 |
| 9,403,426 B1 * | 8/2016 | Boyd | B60J 5/0494 |
| 11,370,280 B1 * | 6/2022 | Salter | B60J 5/101 |

FOREIGN PATENT DOCUMENTS

DE 102013018670 A1 * 5/2015 .............. B60J 5/101

OTHER PUBLICATIONS

English translation of DE 10 2013 018 670; retrieved via Patent Translate located at www.epo.org. (Year: 2025).*

* cited by examiner

*Primary Examiner* — Jason S Daniels
(74) *Attorney, Agent, or Firm* — Young Basile Hanlon & MacFarlane, P.C.

(57) ABSTRACT

A tailgate for a vehicle that includes a door body and a shield that is connected to the door body such that the shield is repositionable between a stowed (retracted) position, in which the shield is concealed by the door body, and a deployed (advanced) position, in which the shield is exposed from the door body. In various embodiments of the disclosure, it is envisioned that the shield may be pivotably (rotatably) connected to the door body or that the shield may be slidably connected to the door body.

20 Claims, 12 Drawing Sheets

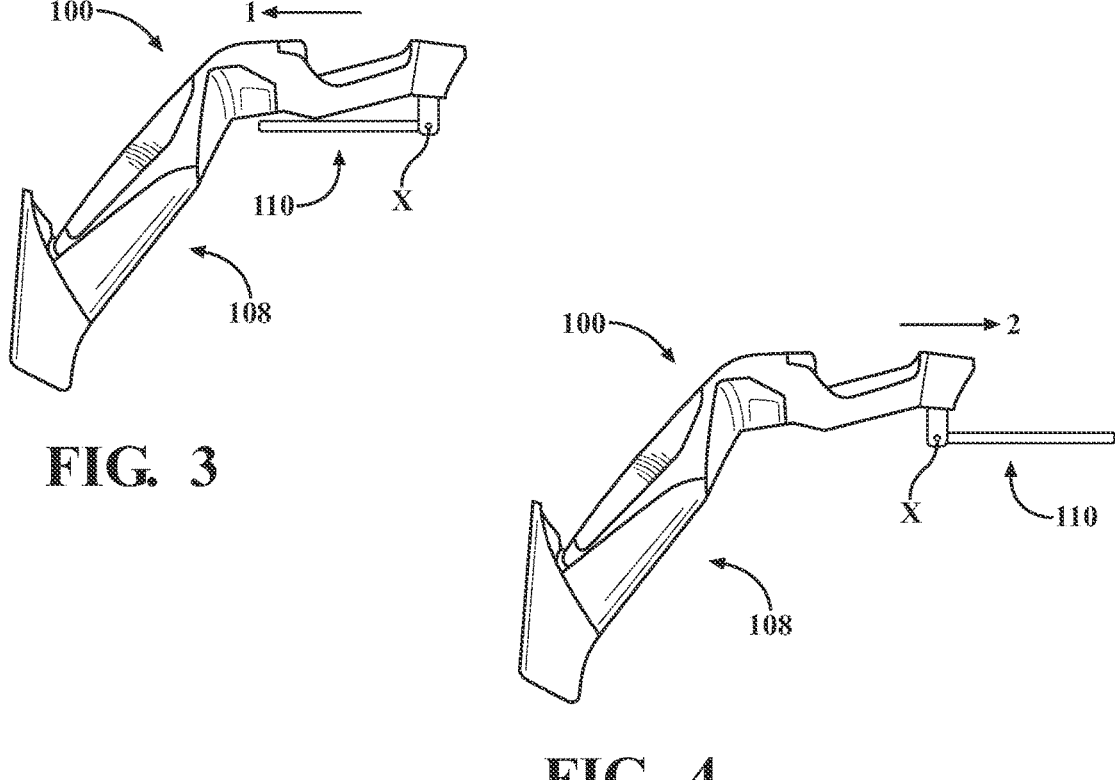
FIG. 3
FIG. 4
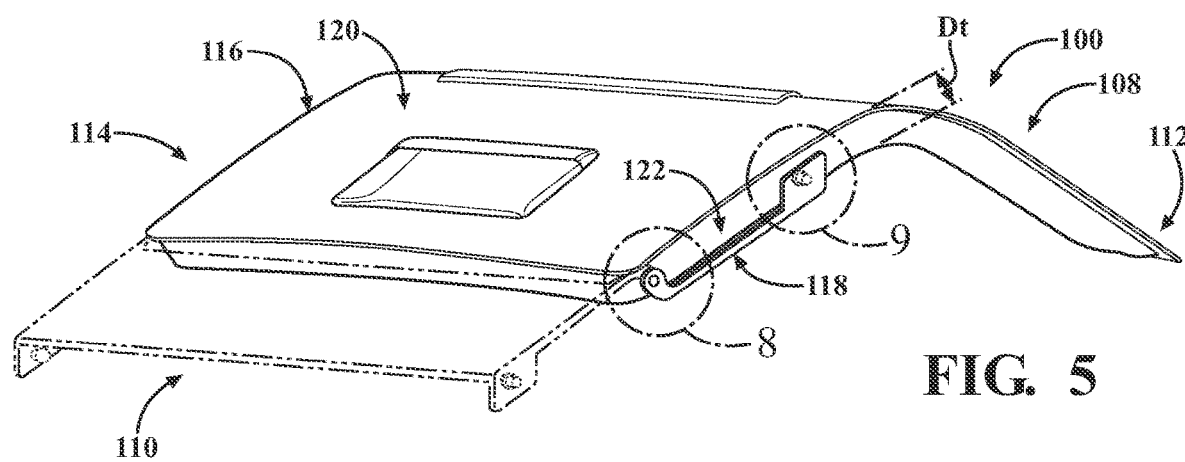
FIG. 5

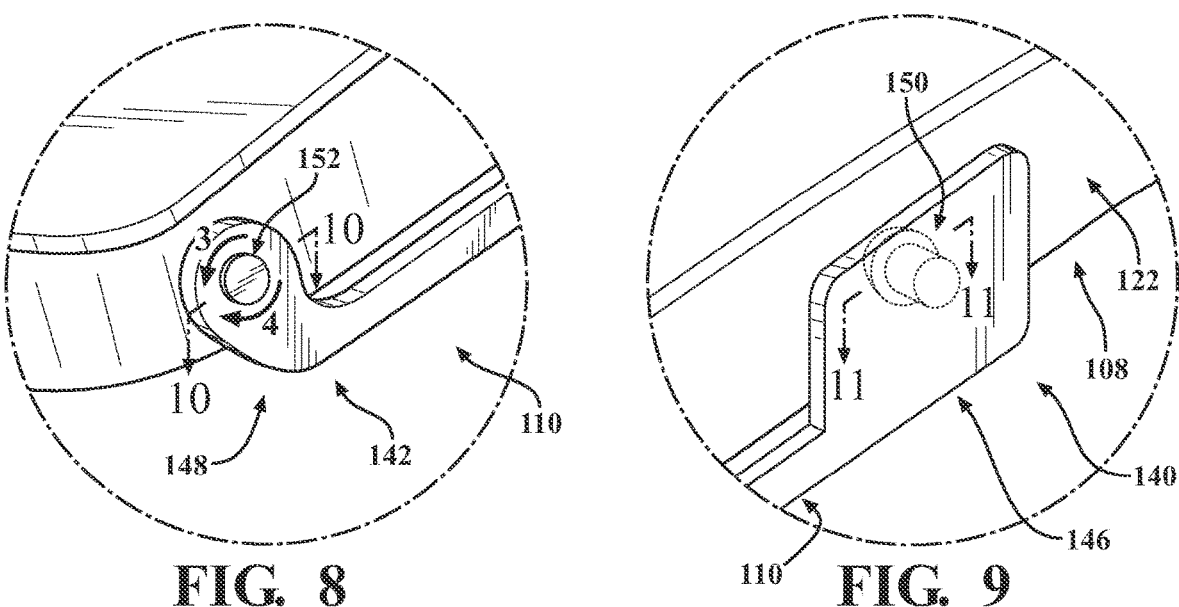
FIG. 8           FIG. 9
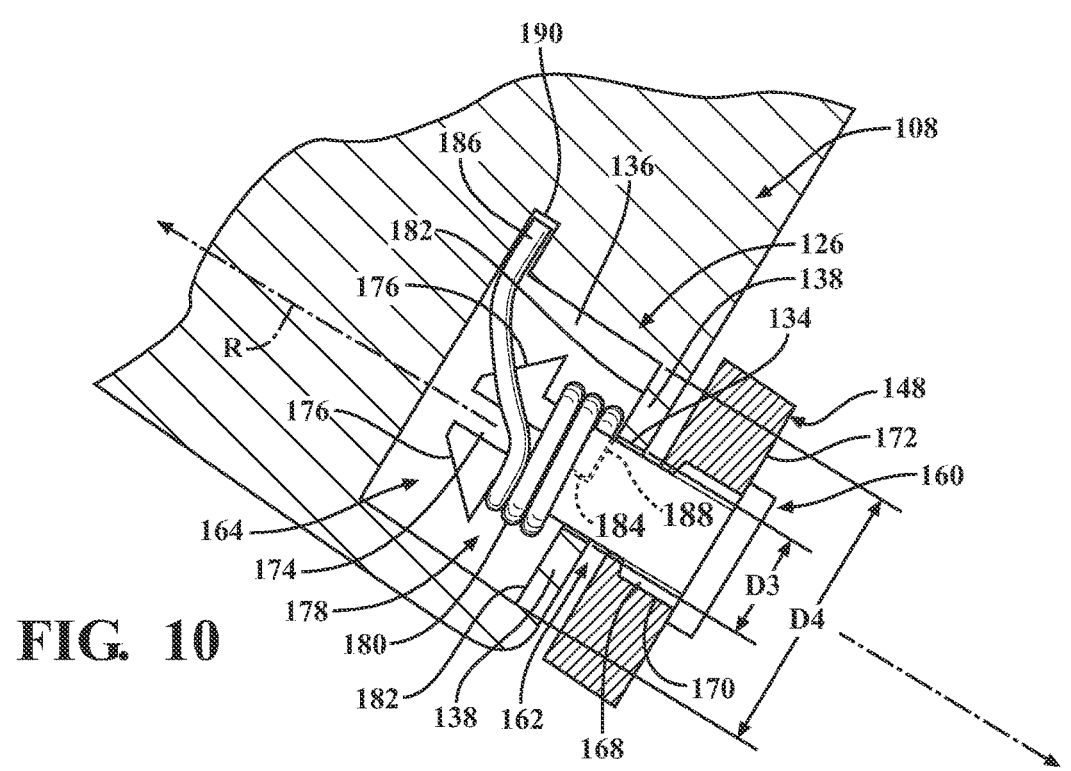
FIG. 10

1

RETRACTABLE SHIELDS FOR VEHICLE TAILGATES

TECHNICAL FIELD

The present disclosure relates to tailgates (e.g., rear hatches) for vehicles and, more specifically, to retractable shields for vehicle tailgates that are (selectively) movable between stowed and deployed positions to protect an interior of the vehicle (e.g., during inclement weather), provide users with protection from the sun, and the like.

BACKGROUND

Many vehicles include a tailgate (e.g., a rear hatch) that provides access to an interior area thereof. When open, tailgates offer protection to the interior of the vehicle, and to users located behind (rearwardly of) the vehicle, from inclement weather (e.g., rain, snow, etc.) and from the sun. In certain vehicles, however, tailgates are designed to open in a more upward (vertical) direction, rather than outwardly (rearwardly), which can undermine the protection offered.

The present disclosure addresses this opportunity by providing a tailgate with a retractable shield that is (selectively) movable between stowed and deployed positions to increase the protection offered by the tailgate.

SUMMARY

In one aspect of the present disclosure, a tailgate for a vehicle is disclosed that includes a door body and a shield that is connected to the door body such that the shield is repositionable between a stowed position, in which the shield is concealed by the door body, and a deployed position, in which the shield is exposed from the door body.

In certain embodiments, the shield may be pivotally connected to the door body.

In certain embodiments, the shield may be biased towards the deployed position.

In certain embodiments, the door body may define a receptacle, and the shield may include an anchor that is configured for removable insertion into the receptacle to thereby secure the shield in the stowed position.

In certain embodiments, the receptacle and the anchor may be configured for engagement in an interference fit.

In certain embodiments, the tailgate may further include a fastener that is connected to the shield and a biasing member.

In certain embodiments, the fastener may extend into the door body such that the shield is pivotable about a pivot axis that extends through the fastener.

In certain embodiments, the biasing member may include a first end that is secured to the fastener and a second end that is in engagement with the door body.

In certain embodiments, the biasing member may be configured to apply a biasing force to the fastener such that, upon removal of the anchor from the receptacle, the shield is automatically repositioned from the stowed position into the deployed position.

In certain embodiments, the shield may be slidably connected to the door body such that the shield is axially movable along a length of the tailgate during repositioning between the stowed position and the deployed position.

In certain embodiments, the door body may define channels that extend in generally parallel relation to the length of the tailgate.

In certain embodiments, the shield may include anchors that extend into the channels.

In certain embodiments, the anchors may be resilient in construction.

In certain embodiments, the anchors may be reconfigurable between a contracted configuration, in which the anchors are configured for insertion into the channels, and an expanded configuration, in which the anchors are configured to secure the shield within the channels.

In certain embodiments, the shield may further include a locking member that is configured for engagement with the door body to thereby inhibit movement of the shield in the stowed position.

In another aspect of the present disclosure, a tailgate for a vehicle is disclosed that includes a door body defining a receptacle and a shield that is pivotably connected to the door body about a pivot axis such that the shield is repositionable between a stowed position, in which the shield extends forwardly of the pivot axis, and a deployed position, in which the shield extends rearwardly of the pivot axis. The shield includes an anchor that is configured for removable insertion into the receptacle to thereby secure the shield in the stowed position.

In certain embodiments, the tailgate may further include a fastener that is connected to the shield and a biasing member that extends between the fastener and the door body.

In certain embodiments, the fastener may extend into the receptacle such that the fastener is rotatable in relation to the door body.

In certain embodiments, the biasing member may be configured to apply a rotational biasing force to the fastener such that the shield is biased towards the deployed position.

In certain embodiments, the biasing member may be configured as a torsion spring.

In certain embodiments, the biasing member may extend about the fastener.

In certain embodiments, the biasing member may include a first end that is secured to the fastener and a second end that is in engagement with the door body.

In certain embodiments, the anchor and the fastener may extend in generally parallel relation.

In another aspect of the present disclosure, a tailgate for a vehicle is disclosed that includes a door body defining channels and a shield that is slidably connected to the door body such that the shield is axially movable through the channels during repositioning between a stowed position, in which the shield is concealed by the door body, and a deployed position, in which the shield is exposed from the door body. The shield includes anchors extending into the channels to thereby secure the shield to the door body.

In certain embodiments, the shield may be received by cavities that are defined by the door body such that outer surfaces of the shield are generally flush with outer surfaces of the door body.

In certain embodiments, the channels may include a non-uniform configuration.

In certain embodiments, the channels may include ingresses and guide portions that extend from the ingresses.

In certain embodiments, the ingresses may define first inner dimensions, and the guide portions may define second inner dimensions that are less than the first inner dimensions.

In certain embodiments, the anchors may be reconfigurable between an expanded configuration, in which the anchors define outer dimensions that are larger than first inner dimensions defined by the ingresses, and a contracted configuration, in which the outer dimensions defined by the anchors are less than the first inner dimensions defined by the ingresses, whereby reconfiguration of the anchors from the expanded configuration into the contracted configuration facilitates insertion of the anchors into the ingresses, and reconfiguration of the anchors from the contracted configuration into the expanded configuration secures the anchors within the channels.

BRIEF DESCRIPTION OF THE DRAWINGS

According to common practice, the various features of the drawings may not be to scale and may be arbitrarily expanded or reduced for clarity.

FIG. 3 is a side, plan view of the tailgate seen in FIGS. 1 and 2 with one embodiment of a shield, which is shown in a stowed position.

FIG. 4 is a side, plan view of the tailgate and the shield seen in FIG. 3 with the shield shown in a deployed position.

FIG. 5 is a rear, perspective view of the tailgate and the shield seen in FIG. 3 with the shield shown in the stowed position (in solid lines) and in the deployed position (in phantom).

FIGS. 8 and 9 are enlargements of the areas of detail identified in FIG. 5.

FIG. 10 is a cross-sectional view taken along line 10-10 in FIG. 8.

DETAILED DESCRIPTION

The present disclosure describes a tailgate for a vehicle that includes a door body and a retractable shield that is connected to the door body such that the shield is (selectively) repositionable between a stowed (retracted) position, in which the shield is concealed by the door body, and a deployed (advanced) position, in which the shield is exposed from (e.g., extends rearwardly of) the door body so as to increase the protection offered by the tailgate from the sun, rain, snow, etc. In various embodiments of the disclosure, it is envisioned that the shield may be pivotably (rotatably) connected to the door body or that the shield may be slidably connected to the door body.

Figures 1, 2:
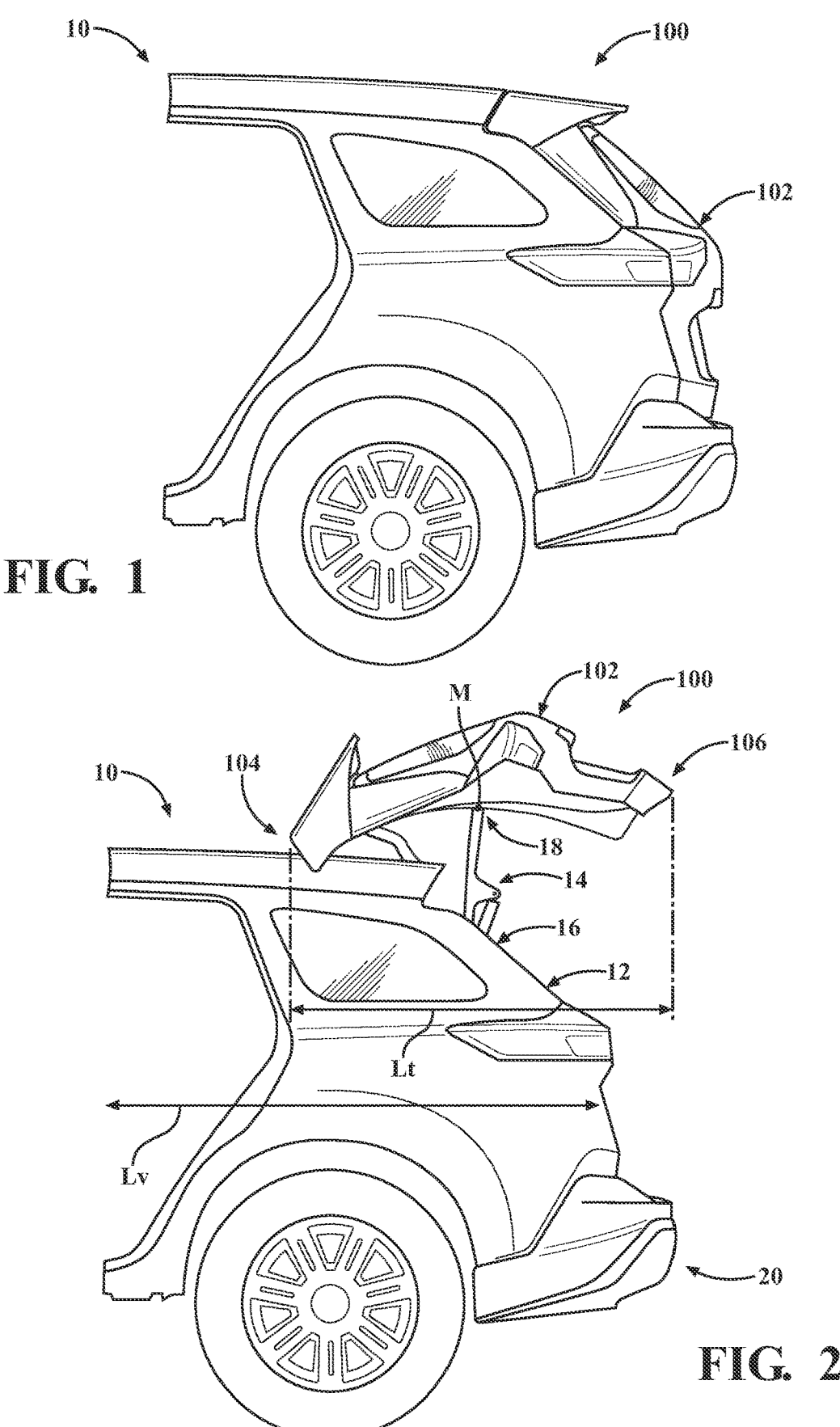
FIG. 1 is a partial, side, plan view of a vehicle including a tailgate shown in a closed position.
FIG. 2 is a partial, side, plan view of the vehicle seen in FIG. 1 with the tailgate shown in an open position.

With reference to FIGS. 1 and 2, a vehicle 10 is illustrated that includes a tailgate 100 (e.g., a rear hatch 102) having respective (first and second) upper and lower ends 104, 106. While the vehicle 10 is generally illustrated and described as a passenger vehicle throughout the present disclosure, it should be appreciated that principles and the components described herein below may find applicability to wide variety of vehicles including, for example, trucks, SUVs, vans, etc.

The tailgate 100 is pivotably (rotatably) connected to a body 12 of the vehicle 10 by one or more brackets 14 such that the tailgate 100 is repositionable (movable) between a closed position (FIG. 1) and an open position (FIG. 2). As seen in FIG. 2, each bracket 14 includes a first end 16 that is pivotably (rotatably) connected to the body 12 of the vehicle 10 and a second end 18 that is pivotably (rotatably) connected to the tailgate 100 at a midpoint M that is spaced (approximately) equidistant from the ends 104, 106 thereof. Pivotably (rotatably) connecting the bracket(s) 14 to the tailgate 100 at the midpoint M allows the tailgate 100 to move outwardly (e.g., rearwardly) and upwardly (e.g., vertically) during repositioning from the closed position to the open position such that the tailgate 100 is positioned (vertically) above, and is spaced (vertically) from, the body 12 of the vehicle 10 in the open position. More specifically, in the illustrated embodiment, the tailgate 100, the body 12 of the vehicle 10, and the bracket(s) 14 are configured such that the lower end 106 of the tailgate 100 is (generally) aligned with, or is positioned forwardly of, a rear end 20 of the vehicle 10, which reduces an overall length Lv of the vehicle 10 when the tailgate 100 is in the open position.

With reference now to FIGS. 3-11 as well, the tailgate 100 defines an overall length Lt, which extends between the ends 104, 106 thereof, and includes a door body 108 and a retractable shield 110 that is pivotably (rotatably) connected to the door body 108 such that the shield 110 is (selectively) repositionable about a pivot axis X (FIGS. 3, 4, 7) between a stowed (first, retracted) position (FIG. 3), in which the shield 110 is concealed by the door body 108, and a deployed (second, advanced) position, in which the shield 110 is exposed from the door body 108. More specifically, as seen in FIG. 3, when the shield 110 is in the stowed position, the shield 110 is oriented in a forward direction 1 (e.g., such that the shield 110 extends (generally) forward of the pivot axis X), and when the shield 110 is in the deployed position, the shield 110 extends rearwardly of the door body 108 and is oriented in a rearward direction 2 (e.g., such that the shield 110 extends (generally) rearward of the pivot axis X), as seen in FIG. 4, so as to provide a barrier to sun, rain, snow, etc., thereby improving (increasing) the protection offered to the interior of the vehicle 10 and to users by the tailgate 100.

The door body 108 defines a (first) upper end 112, a (second) lower end 114, and opposite lateral ends 116, 118, and includes an outer shell 120 and a trim panel 122 that is supported by the outer shell 120. It is envisioned that the door body 108 may include any suitable material or combination of materials and may be formed through any suitable method of manufacture (e.g., injection molding, casting, laser machining, etc.). In the illustrated embodiment, for example, the outer shell 120 includes (e.g., is formed partially or entirely from) one or more metallic materials, such as aluminum or stainless steel, and the trim panel 122 includes (e.g., is formed partially or entirely from) one or more non-metallic materials, such as plastic(s), polymer(s), and/or composite materials (e.g., carbon fiber). Embodiments in which the door body 108 may include a single material of construction are also envisioned herein, however, and would not be beyond the scope of the present disclosure.

The door body 108 (e.g., the trim panel 122) defines one or more (first, upper) receptacles 124 and one or more (second, lower) receptacles 126, which are spaced (vertically) from each other along the length Lt of the tailgate 100. More specifically, in the illustrated embodiment, the door body 108 includes a receptacle 124 and a receptacle 126 at each of the lateral ends 116, 118 thereof (e.g., such that the door body 108 includes a pair of receptacles 124 and a pair of receptacles 126). Embodiments of the tailgate 100 including both fewer and greater numbers of receptacles 124, 126 are also envisioned herein. For example, embodiments of the tailgate 100 including a single receptacle 124 and/or a single receptacle 126 (e.g., at the lateral end 116 or the lateral end 118) are also envisioned herein and would not be beyond the scope of the present disclosure.

The receptacles 124 are located between the ends 104, 106 of the tailgate 100 and extend (laterally) into the door body 108 (e.g., along a width Wt (FIG. 6) of the tailgate 100 and towards a centerline C thereof). The receptacles 124 each include an ingress 128 (FIG. 11), which defines a (first) inner dimension D1, and a well 130 that is in communication with the ingress 128 and defines a (second) inner dimension D2 that exceeds the inner dimension D1 so as to define overhangs 132.

The (second, lower) receptacles 126 are located at (adjacent to) the lower end 106 of the tailgate 100 and extend (laterally) into the door body 108 (e.g., along the width Wt of the tailgate 100 and towards the centerline C thereof). The receptacles 126 each include an ingress 134, which defines a (first) inner dimension D3, and a well 136 that is in communication with the ingress 134 and which defines a (second) inner dimension D4 that exceeds the inner dimension D3 so as to define overhangs 138.

Referring now to FIGS. 7-11 in particular, the shield 110 will be discussed. The shield 110 may include any suitable material or combination of materials and may be formed through any suitable method of manufacture (e.g., injection molding, casting, laser machining, etc.). In the illustrated embodiment, the shield 110 includes (e.g., is formed partially or entirely from) one or more non-metallic materials, such as plastic(s), polymer(s), and/or composite materials (e.g., carbon fiber), which imparts sufficient rigidity to the shield 110 to support pivotable (rotatable) repositioning of the shield 110 between the stowed position and the deployed position while allowing the shield 110 to bend (deflect) in the manner described herein. Embodiments in which the shield 110 may include (e.g., may be formed partially or entirely from) one or more metallic materials, however, such as aluminum or stainless steel, are also envisioned herein and would not be beyond the scope of the present disclosure.

Figure 6:
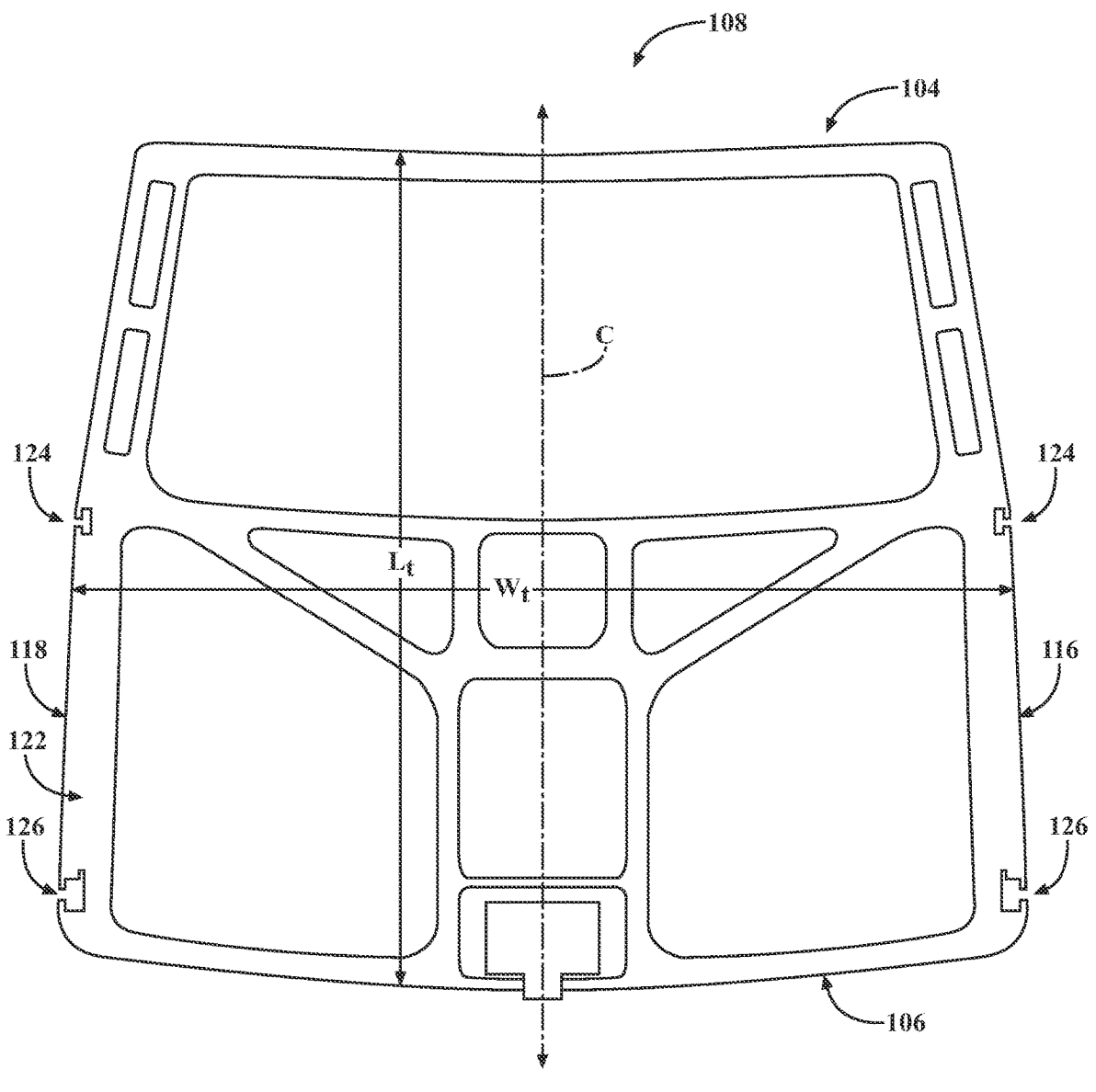
FIG. 6 is an inner, plan view of the tailgate seen in FIG. 3.

The shield 110 includes: respective (first and second) upper and lower ends 140, 142; a body panel 144; one or more (first) upper flanges 146, which are located at (adjacent to) the upper end 140 of the shield 110; one or more (second) lower flanges 148, which are located at (adjacent to) the lower end 142 of the shield 110; one or more anchors 150, which are supported by (e.g., connected to) the flange(s) 146 and are configured for removable insertion into the receptacle(s) 124 (FIGS. 6, 11); and one or more fastener(s) 152, which are supported by (e.g., connected to) the flange(s) 148 and are configured for insertion into the receptacles 126 (FIGS. 6, 10).

The flange(s) 146 correspond in location and number to the receptacle(s) 124, and the flange(s) 148 correspond in location and number to the receptacle(s) 126. As such, in the illustrated embodiment, the shield 110 includes a pair of flanges 146, and, thus, a pair of anchors 150, as well as a pair of flanges 148, and, thus, a pair of fasteners 152. Embodiments of the tailgate 100 including both fewer and greater numbers of flanges 146, anchors 150, flanges 148, and fasteners 152 are also envisioned herein (e.g., depending upon the particular configuration of the tailgate 100, the number of receptacles 124, 126, etc.), however. For example, embodiments of the shield 110 including a single flange 146, a single anchor 150, a single flange 148, and/or a single fastener 152 are also envisioned herein and would not be beyond the scope of the present disclosure.

In the illustrated embodiment, the flanges 146, 148 are formed integrally (monolithically, unitarily) with the body panel 144 such that the body panel 144 and the flanges 146, 148 are formed from a single piece of material such as, for example, via injection molding, CNC machining, etc. Embodiments are also envisioned, however, in which the body panel 144, the flanges 146, and/or the flanges 148 may be configured as discrete components that may be connected together in any suitable manner such as, for example, via one or more mechanical fasteners (e.g., pushpins, bolts, screws, rivets, clips, etc.), via an adhesive, etc.

Additionally, while the flange 146 is illustrated as including a (generally) polygonal (e.g., square, rectangular, etc.) configuration and the flange 148 is illustrated as including a non-polygonal (e.g., (generally) annular, elliptical, etc.) configuration, embodiments in which the flanges 146, 148 may include (generally) identical configurations are also envisioned herein and would not be beyond the scope of the present disclosure.

The anchors 150 extend (laterally) inward from the flanges 146 (e.g., along the width Wt (FIG. 6) of the tailgate 100 and towards the centerline C thereof) and each include a stem 154 and a head 156. In the illustrated embodiment, the anchors 150 are formed integrally (monolithically, unitarily) with the flanges 146, whereby the anchors 150 and the flanges 146 are formed from a single piece of material such as, for example, via injection molding, CNC machining, etc. Embodiments are also envisioned, however, in which the anchors 150 and the flanges 146 may be configured as discrete components that may be connected together in any suitable manner such as, for example, via one or more mechanical fasteners (e.g., pushpins, bolts, screws, rivets, clips, etc.), via an adhesive, etc.

Each stem 154 defines a (first) outer dimension D5 (FIG. 7), which is less than the inner dimension D1 (FIG. 11) defined by the ingress 128 of the corresponding receptacle

124, and each head 156 defines a (second) outer dimension D6, which exceeds the dimensions D1, D5, but is less than the inner dimension D2 (FIG. 11) defined by the well 130 of the corresponding receptacle 124. As such, upon insertion of the anchors 150 into the receptacles 124, the heads 156 engage (contact) inner walls 158 of the receptacles 124, which are defined by the overhangs 132, thereby securing the anchors 150 in place.

The stems 154 define a length Ls1 (FIG. 11) that is (approximately) equivalent to a thickness Tol defined by the overhangs 132. As such, upon insertion of the anchors 150 into the receptacles 124, the overhangs 132 are captured (located, secured) between the heads 156 of the anchors 150 and the flanges 146, which secures the shield 110 in relation to the door body 108 when the shield 110 is in the stowed position, as described in further detail below.

The relative dimensioning between the anchors 150 and the receptacles 124 facilitates removable insertion of the anchors 150 into the receptacles 124 in an interference fit (e.g., a snap fit, a press fit, etc.), which supports repositioning of the shield 110 between the stowed position (FIG. 3) and the deployed position (FIG. 4). More specifically, insertion of the anchors 150 into the receptacles 124 secures the shield 110 in the stowed position until the protection offered by the shield 110 is necessary or desired, at which time, the anchors 150 can be removed from the receptacles 124 to allow for repositioning of the shield 110 from the stowed position into the deployed position.

It is envisioned that the materials used in construction of the anchors 150 and/or the door body 108 (e.g., the trim panel 122) may be elected so as to support reception of the anchors 150 by the receptacles 124 in the interference fit described above. For example, it is envisioned that the elected materials may impart sufficient flexibility to the flanges 146, the anchors 150, and/or the receptacles 124 to allow the flanges 146, the anchors 150, and/or the receptacles 124 to resiliently deform (e.g., bend, compress, flex, etc.) during insertion of the anchors 150 into, and removal of the anchors 150 from, the receptacles 124 in the manner described above.

Additionally, while the anchors 150 and the receptacles 124 are respectively shown as being provided on the shield 110 and the door body 108, embodiments are envisioned in which the locations of the anchors 150 and the receptacles 124 may be reversed (e.g., such that the anchors 150 and the receptacles 124 are provided on the door body 108 and the shield 110, respectively).

The fasteners 152 are connected to the shield 110 and extend (laterally) inward from the flanges 148 (e.g., along the width Wt (FIG. 6) of the tailgate 100 and towards the centerline C thereof). As such, in the illustrated embodiment, the anchors 150 and the fasteners 152 extend (are oriented) in (generally) parallel relation, as are the receptacles 124 and the receptacles 126. Embodiments are also envisioned, however, in which the anchors and the fasteners 152 and the anchors 150, as well as the receptacles 124 and the receptacles 126, may extend (be oriented) in non-parallel relation. For example, in one particular embodiment, it is envisioned that the receptacles 124 and the anchors 150 may extend in (generally) parallel relation to the axial dimension Lv (FIG. 2) of the vehicle 10 (e.g., along a depth Dt (FIG. 5) of the tailgate 100) such that the fasteners 152 and the anchors 150, as well as the receptacles 124 and the receptacles 126, may extend (be oriented) in (generally) orthogonal relation.

The fasteners 152 each include: a head 160 (FIG. 7), which defines a (first) outer dimension D7; a stem 162, which extends (laterally inward) from the head 160 and defines a (second) outer dimension D8; and a retainer 164, which extends (radially outward) from the stem 162 and defines a (third) outer dimension D9. More specifically, the fasteners 152 extend through openings 166 in the flanges 148, whereby the heads 160 are located (laterally) outward of the flanges 148 and the stems 162 extend through the flanges 148 such that the retainers 164 are located (laterally) inward thereof (e.g., within the wells 136 of the receptacles 126).

In the illustrated embodiment, the fasteners 152 and the flanges 148 are configured as discrete components of the tailgate 100. Embodiments are also envisioned, however, in which the fasteners 152 and the flanges 148 may be integrally (monolithically, unitarily) such that the fasteners 152 and the flanges 148 are formed from a single piece of material such as, for example, via injection molding, CNC machining, etc.

As seen in FIG. 10, the heads 160 of the fasteners 152 include one or more projections 168 (e.g., ribs, detents, etc.) that are received by one or more corresponding recesses 170 (e.g., slots, indentations, etc.) in the flanges 148. Reception of the projection(s) 168 by the recess(es) 170 provides an anti-rotation feature that inhibits (if not entirely prevents) relative (rotational) movement between the fasteners 152 and the shield 110 such that pivoting (rotation) of the shield 110 during repositioning between the stowed and deployed positions causes corresponding, concomitant movement (e.g., rotation) of the fasteners 152 in relation to the door body 108 (e.g., within the receptacles 126). More specifically, during repositioning of the shield 110 between the stowed and deployed positions, the fasteners 152 rotate about axes R (FIGS. 7, 11), which collectively define the pivot axis X (FIGS. 3, 4, 7) for the tailgate 100 such that the pivot axis X extends through the fasteners 152.

The fasteners 152 are configured such that the dimensions D7, D9 (defined by the heads 160 and the retainers 164, respectively) each exceed the inner dimension D3 (FIG. 10) defined by the ingress 134 of the corresponding receptacle 126 and an inner dimension D10 defined by the openings 166 extending through the flanges 148, but are less than the inner dimension D4 defined by the well 136 of the corresponding receptacle 126, and such that the dimension D8 (defined by the stems 162) is less than the dimensions D3, D10. As such, upon insertion of the fasteners 152 through the flanges 148 and into the receptacles 126, the heads 160 are positioned in engagement (contact) with outer surfaces 172 (FIG. 10) of the flanges 148, the stems 162 extend into, and are received by (located within) the openings 166 and the ingresses 134, and the retainers 164 are located within the wells 136.

Figure 7:
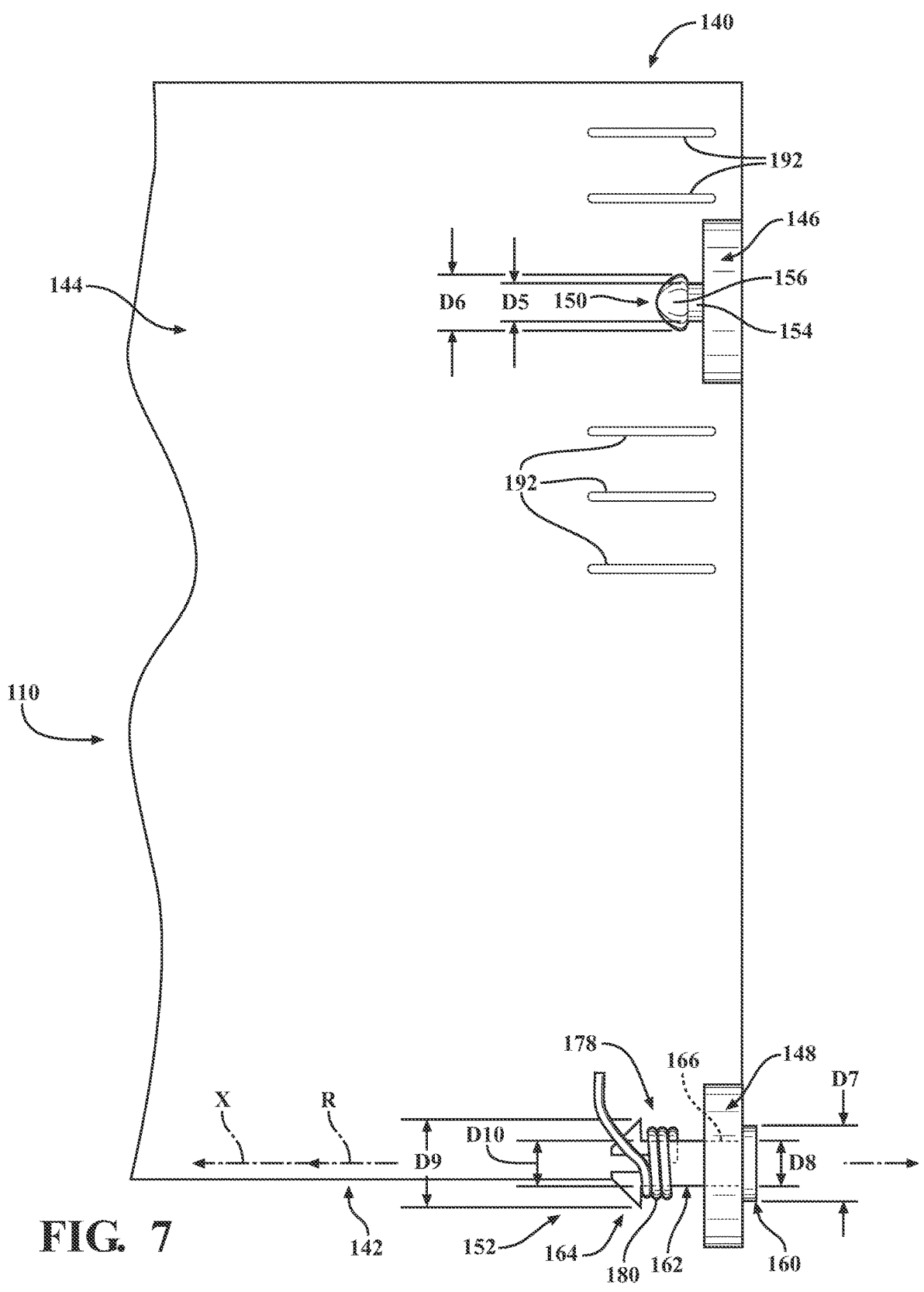
FIG. 7 is an inner, plan view of the shield seen in FIG. 3.

As a result of the relative dimensioning between the stems 162 and the ingresses 134 (e.g., due to fact that the outer dimensions D8 are less than the inner dimensions D3), during repositioning of the shield between the stowed and deployed positions, the fasteners 152 rotate in relation to the door body 108 (e.g., within the receptacles 126) about the axes of rotation R (FIGS. 7, 10), which allows the shield 110 to pivot (rotate) about the pivot axis X (FIGS. 3, 4, 7).

The fasteners 152 are resilient in construction and include one or more flexible (deformable) materials, whether metallic or non-metallic, which facilitates insertion of the fasteners 152 into the receptacles 126 through the flanges 148. More specifically, during connection of the shield 110 to the door body 108, the fasteners 152 are reconfigured from an expanded (first, initial, normal) configuration into a contracted (second, subsequent) configuration, during which, the retainers 164 are compressed (radially inward) in order to reduce the outer dimensions D9 thereof and facilitate passage of the retainers 164 through the openings 166 (FIG. 7) in the flanges 148, through the ingresses 134 (FIG. 10), and into the wells 136. Due to the resilient construction of the fasteners 152, compression of the retainers 164 results in the creation of a biasing force that automatically returns the retainers 164 to their expanded configurations as the retainers 164 clear (are advanced (laterally) inward beyond) the ingresses 134.

In order to facilitate reconfiguration of the fasteners 152 from the expanded configuration into the contracted configuration, the fasteners 152 include axial slots 174 (FIG. 10), which extend into the retainers 164 and the stems 162 (e.g., towards the heads 160), and (outer) bearing surfaces 176, which are provided on the retainers 164 and include tapered (chamfered, angled) configurations. During connection of the shield 110 to the door body 108, as the fasteners 152 are advanced (laterally) inward (e.g., towards the receptacles 126), the bearing surfaces 176 engage (contact) the flanges 148 (e.g., adjacent to the openings 166) and the door body 108 (e.g., adjacent to the ingresses 134), which applies a compressive force to the retainers 164 that is directed (radially) inward. The compressive force constricts the axial slots 174, which reduces the outer dimensions D9 defined by the retainers 164 so as to permit advancement of the fasteners 152 through the openings 166, through the ingresses 134, and into the wells 136, upon which, fasteners 152 are automatically returned to their expanded configurations, thereby securing (retaining) the fasteners 152 within the flanges 148 and the receptacles 126.

In certain embodiments of the disclosure, such as that illustrated in FIGS. 3-11, the shield 110 is biased towards the deployed position such that, upon removal of the anchors 150 from the receptacles 124, the shield 110 is automatically repositioned from the stowed position (FIG. 3) into the deployed position (FIG. 4). In order to bias the shield 110 toward the deployed position, the tailgate 100 includes one or more biasing members 178 (FIGS. 7, 10). More specifically, in the illustrated embodiment, the biasing member(s) 178 are configured as torsion springs 180.

While the tailgate 100 is shown as including pair of biasing members 178 in the illustrated embodiment, embodiments of the tailgate 100 including both fewer and greater numbers of biasing members 178 are also envisioned herein. For example, embodiments of the tailgate 100 including a single biasing member 178 are also envisioned herein and would not be beyond the scope of the present disclosure.

The biasing members 178 are located within the receptacles 126 and extend about the stems 162 of the fasteners 152 such that the biasing members 178 are positioned between the retainers 164 and the heads 160, and such that the biasing members 178 engage (contact) both the fasteners 152 and the door body 108. More specifically, the biasing members 178 are positioned in engagement (contact) with the retainers 164 and inner walls 182 of the receptacles 126 such that the overhangs 138 are captured (located, secured) between the biasing members 178 and the flanges 148, as seen in FIG. 10, which further secures the shield 110 to the door body 108.

The biasing members 178 include first ends 184 (FIG. 10), which are secured (e.g., fixedly connected) to corresponding fasteners 152, and second ends 186, which engage (contact) the door body 108. More specifically, in the illustrated embodiment, the first ends 184 of the biasing members 178 are located (positioned) within (received by)

apertures 188 that extend into the stems 162 (e.g., in (generally) orthogonal relation thereto), and the second ends 186 of the biasing members 178 are received by recesses 190 that extend axially from the wells 136 (e.g., towards the receptacles 124 and in (generally) parallel relation to the length Lt (FIG. 6) of the tailgate 100).

During repositioning of the shield 110 from the deployed position into the stowed position, as the fasteners 152 rotate within the receptacles 126 (e.g., in a first direction 3 (FIG. 8)), the second ends 186 (FIG. 10) of the biasing members 178 act upon the door body 108 (via engagement (contact) with the recesses 190), whereby a (torsional, rotational) biasing force is created in the biasing members 178 that is directed in a second, opposite direction 4. The biasing force is applied to (acts upon) the fasteners 152 by virtue of the connection between the fasteners 152 and the first ends 184 of the biasing members 178, and is transmitted to the shield 110 by virtue of the engagement (contact) between the fasteners 152 and the flanges 148 established the projection(s) 168 and the recess(es) 170, thereby biasing the shield 110 towards the deployed position.

With reference now to FIGS. 1-11, use of the tailgate 100 and the shield 110 will be discussed.

Initially, the tailgate 100 is moved from the closed position (FIG. 1) into the open position (FIG. 2) such that the tailgate 100 is positioned (vertically) above, and is spaced (vertically) from, the body 12 of the vehicle 10. Thereafter, should additional protection from the sun, rain, snow, etc., be desired, the shield 110 can be utilized by repositioning the shield 110 from the stowed position (FIG. 3) into the deployed position (FIG. 4).

In order to reposition the shield 110 from the stowed position into the deployed position, the anchors 150 (FIGS. 7, 9, 11) are removed from the receptacles 124 by bending (deflecting) the flanges 146 (laterally) outward (e.g., away from each other and away from the centerline C (FIG. 6) of the tailgate 100 along the width Wt thereof). Upon removal of the anchors 150 from the receptacles 124, the biasing members 178 (FIGS. 7, 10) act upon the door body 108 (via the interface between the second ends 186 of the biasing members 178 and the recesses 190) and the fasteners 152 (via the interface between first ends 184 of the biasing members 178 and the stems 162) to transmit the biasing force to the shield 110 (via the interface between the heads 160 and the flanges 148 established by the projections 168 and the recesses 170, respectively) and thereby rotate the fasteners 152 (within the receptacles 126 and the ingresses 134) about the axes of rotation R (FIGS. 7, 10) in the second direction 4 (FIG. 8). Rotation of the fasteners 152 causes concomitant movement (pivoting, rotation) of the shield 110 about the pivot axis X (FIGS. 3, 4, 7), thereby automatically repositioning the shield 110 from the stowed position (FIG. 3) into the deployed position (FIG. 4).

When use of the shield 110 is no longer desired, the shield 110 can be returned to the stowed position by (manually) applying sufficient force to the shield 110 to cause movement (pivoting, rotation) in the first direction 3 (FIG. 8), which causes concomitant rotation of the fasteners 152. As the fasteners 152 rotate in the first direction 3, the biasing members 178 act upon the door body 108, thereby restoring the biasing force. Movement (pivoting, rotation) of the shield 110 continues until the anchors 150 are re-inserted to the receptacles 124, which is facilitated by bending (deflecting) the flanges 146 (laterally) outward, thereby securing the shield 110 in the stowed position.

In certain embodiments, the tailgate 100 include one or more dampeners 192 (FIG. 7). The dampener(s) 192 are configured to inhibit (if not entirely prevent) unintended relative movement between the door body 108 (FIG. 5) and the shield 110 (e.g., shaking, rattling, etc.) when the shield 110 is in the stowed position, and may include any material or combination of materials suitable for that intended purpose. For example, it is envisioned that the dampener(s) 192 may include one or more compliant (e.g., resilient, compressible, flexible) materials.

In the illustrated embodiment, the dampener(s) 192 are located on (connected, secured to) the body panel 144 of the shield 110 such that the dampener(s) 192 engage (contact) the door body 108 when the shield 110 is in the stowed position. Embodiments in which the dampener(s) 192 may be located on (connected, secured to) the door body 108 such that the dampener(s) 192 engage (contact) the body panel 144 of the shield 110 when the shield 110 is in the stowed position are also envisioned herein, however, and would not be beyond the scope of the present disclosure.

Although shown as including a plurality of dampeners 192 that are (generally) linear in configuration, it should be appreciated that the specific number and/or the specific configuration of the dampener(s) 192 may be varied in alternate embodiments without departing from the scope of the present disclosure. For example, embodiments of the shield 110 including a single dampener 192 are also envisioned herein, as are embodiments in which the dampener(s) 192 may be non-linear (e.g., (generally) annular) in configuration.

Figures 11, 12, 13:
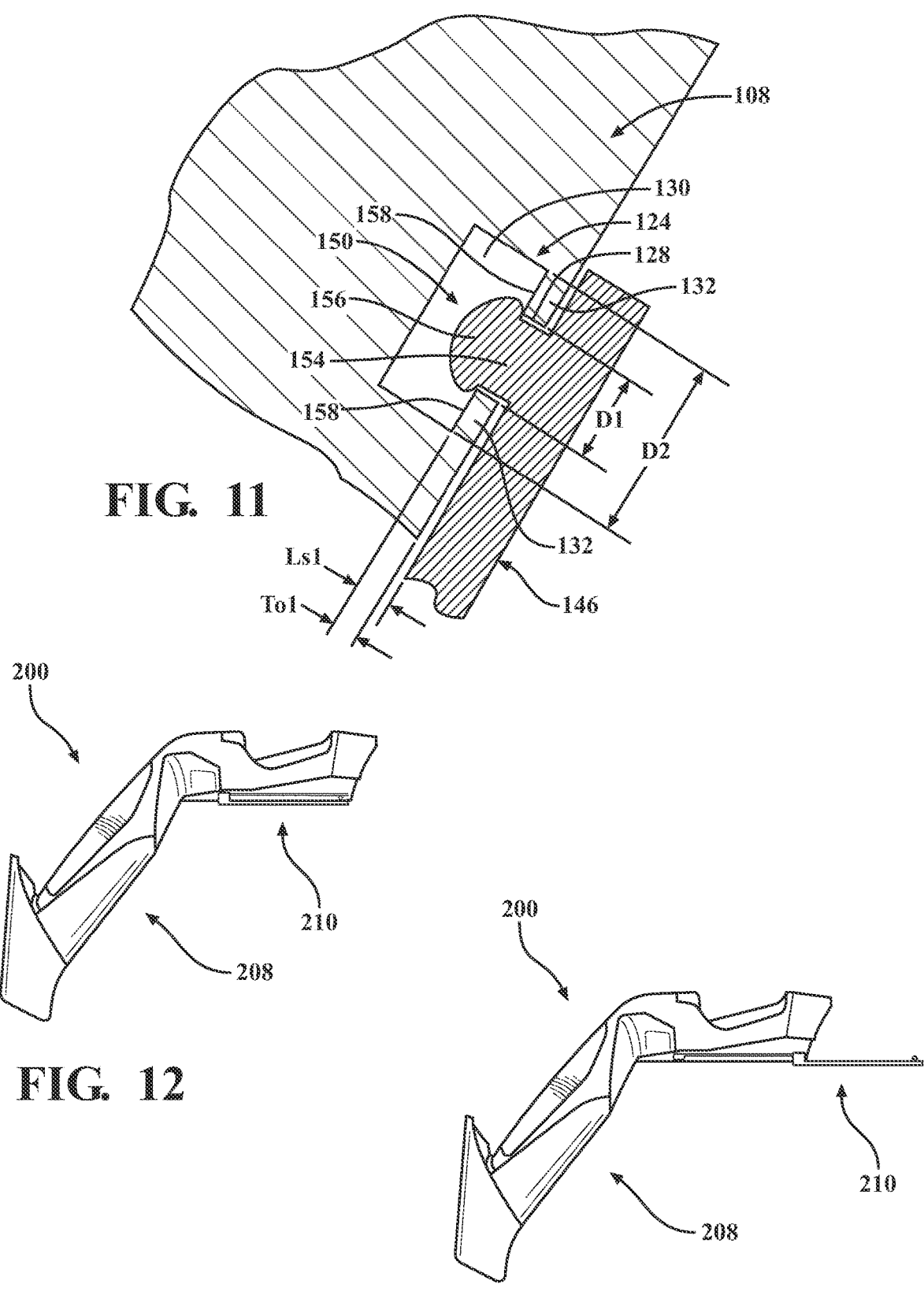
FIG. 11 is a cross-sectional view taken along line 11-11 in FIG. 9.
FIG. 12 is a side, plan view of the tailgate seen in FIGS. 1 and 2 with an alternate embodiment of the shield, which is shown in a stowed position.
FIG. 13 is a side, plan view of the tailgate and the shield seen in FIG. 12 with the shield shown in a deployed position.

With reference to FIGS. 12 and 13, a tailgate 200 will be discussed, which is an alternate embodiment of the tailgate 100. The tailgate 200 includes a door body 208 and a shield 210 (also referred to as a retractable shield), which are substantially similar in both structure and function to the door body 108 and the shield 110 discussed above (FIGS. 1-11). Accordingly, in the interest of brevity, the tailgate 200, the door body 208, and the shield 210 will only be discussed with respect to differences from the tailgate 100, the door body 108, and the shield 110, respectively. As such, identical reference characters will be utilized to refer to elements, structures, features, etc., common to the tailgate 100, the tailgate 200, the door bodies 108, 208, the shield 110, and the shield 210.

The shield 210 is slidably connected to the door body 208 such that the shield 210 is (selectively) repositionable between a stowed (first, retracted) position (FIG. 12), in which the shield 210 is concealed by the door body 208, and a deployed (second, advanced) position (FIG. 13), in which the shield 210 is exposed from the door body 208 so as to provide a barrier to sun, rain, snow, etc., as discussed above. As such, in contrast to the tailgate 100 (FIGS. 1-11), in which the shield 110 is pivotably (rotatably) repositionable in relation to the door body 108 about the pivot axis X (FIGS. 3, 4, 7), the shield 210 is axially repositionable in relation to the door body 208 along (e.g., in (generally) parallel relation to) the length Lt (FIG. 2) of the tailgate 200.

Figure 14:
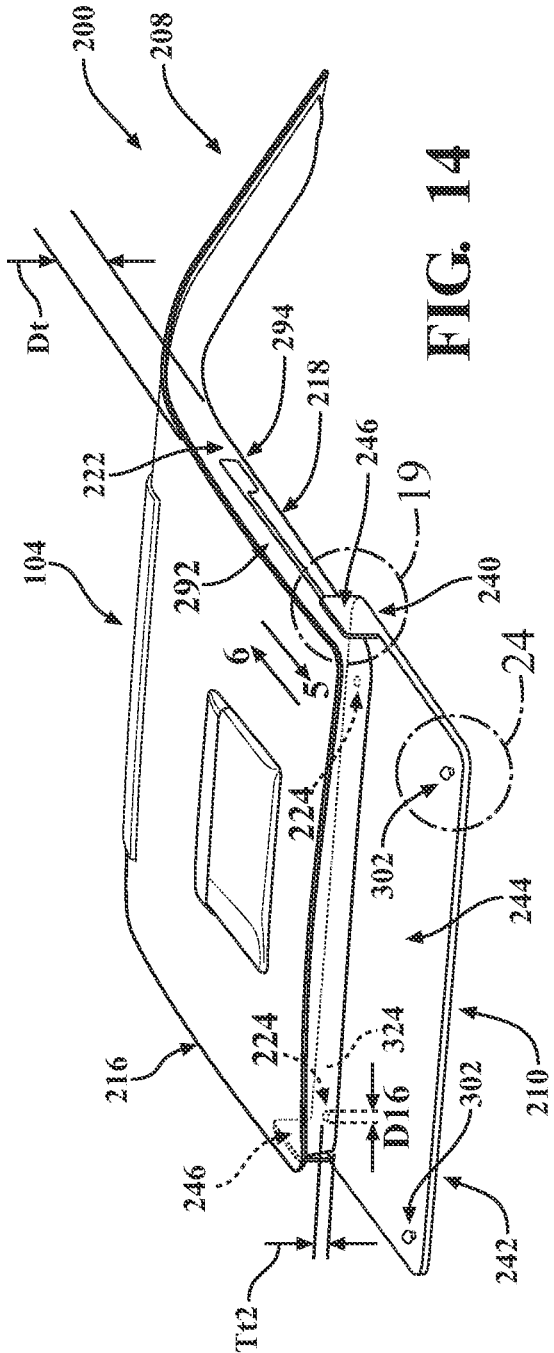
FIG. 14 is a rear, perspective view of the tailgate and the shield seen in FIG. 12 with the shield shown in the deployed position.
Figure 15:
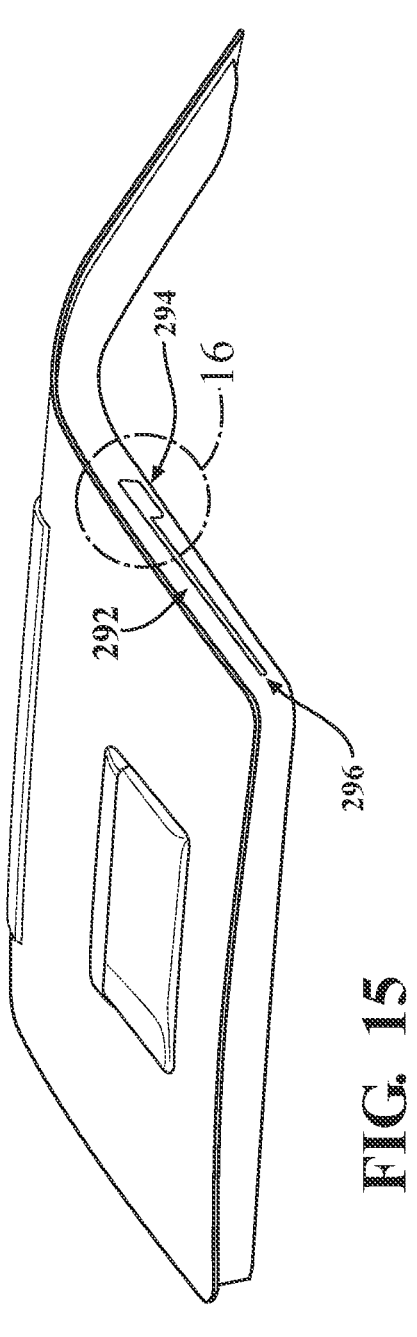
FIG. 15 is a rear, perspective view of the tailgate seen in FIG. 12 (with the shield removed).
Figure 16:
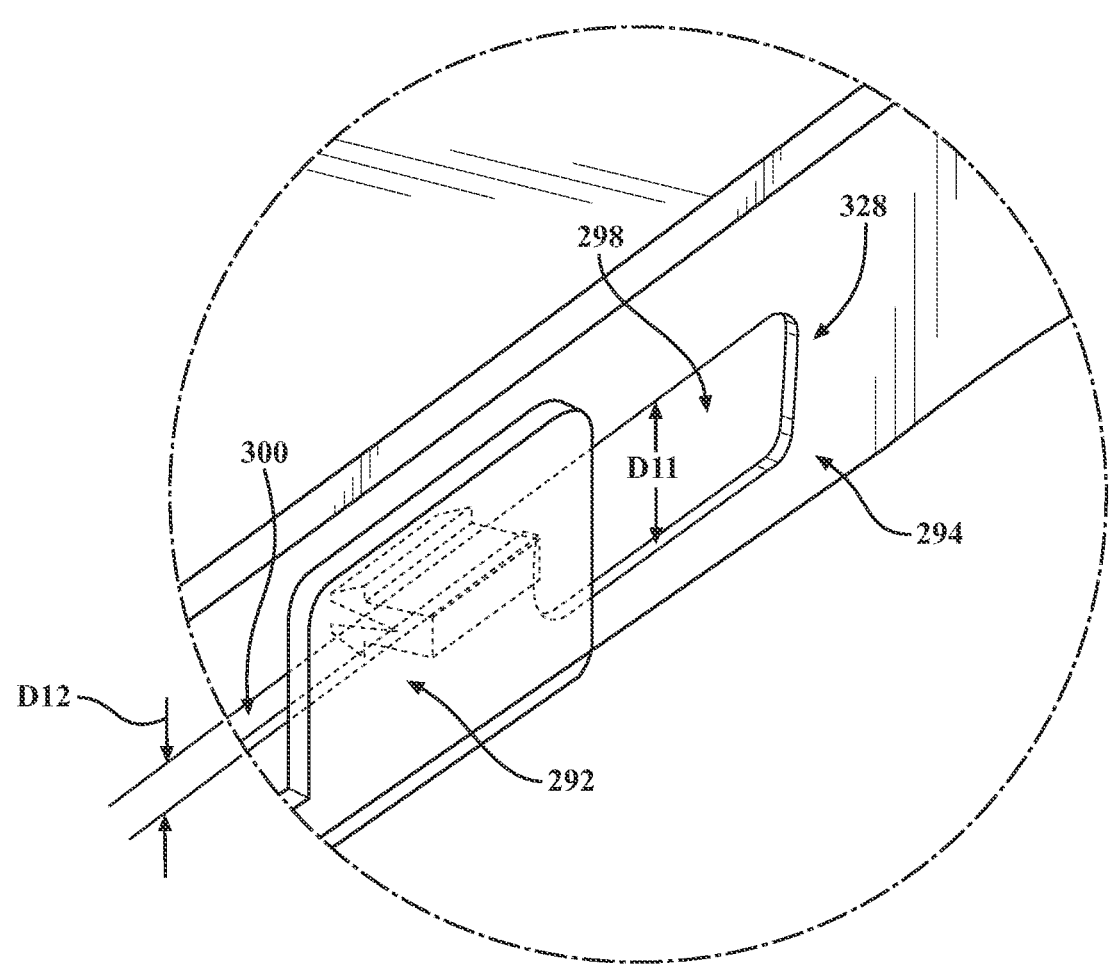
FIG. 16 is an enlargement of the area of detail identified in FIG. 15.

As seen in FIGS. 14-16, the door body 208 includes a trim panel 222 that defines one or more receptacles 224 and a pair of (axial) channels 292 defining (first and second) upper and lower ends 294, 296, which are located at lateral ends 216, 218 of the door body 208 and extend along (e.g., in (generally) parallel relation to) the length Lt (FIG. 2) of the tailgate 200.

The receptacle(s) 224 extends into the door body 208 in (generally) parallel relation to the axial dimension Lv (FIG. 2) of the vehicle 10 (e.g., along the depth Dt (FIG. 14) of the tailgate 200). As described in further detail below, the receptacle(s) 224 are configured for engagement (contact) with the shield 210 in order to maintain the shield in the stowed position.

The channels 292 receive the shield 210 so as to connect the shield 210 to the door body 208 and support the shield 210 during repositioning between the stowed and deployed positions. Each channel 292 extends (laterally) into the door body 208 (e.g., towards the centerline C (FIG. 6) of the tailgate 200) in (generally) orthogonal relation to the receptacle(s) 224 and in (generally) parallel relation to the length Lt of the tailgate 200.

In the illustrated embodiment, the channels 292 includes a non-uniform configuration that varies between the ends 294, 296 thereof. More specifically, as seen in FIG. 16, each channel 292 includes an ingress 298, which is located at the upper end 294 thereof and defines a (first) inner dimension D11, and a guide portion 300, which extends from the ingress 298 to the lower end 296 thereof and defines a (second) inner dimension D12, which is less than the inner dimension D11. Embodiments in which the channels 292 may include a uniform configuration (e.g., embodiments in which the channels 292 may define a (generally) consistent inner dimension between the ends 294, 296 thereof) are also envisioned herein, however, and would not be beyond the scope of the present disclosure.

With reference now to FIGS. 17-24 as well, the shield 210 will be discussed. The shield 210 includes: respective (first and second) upper and lower ends 240, 242; a body panel 244; a pair of flanges 246, which are located at (adjacent to) the upper end 240 of the body panel 244; a pair of anchors 250; and one or more locking members 302.

Figures 17, 18:
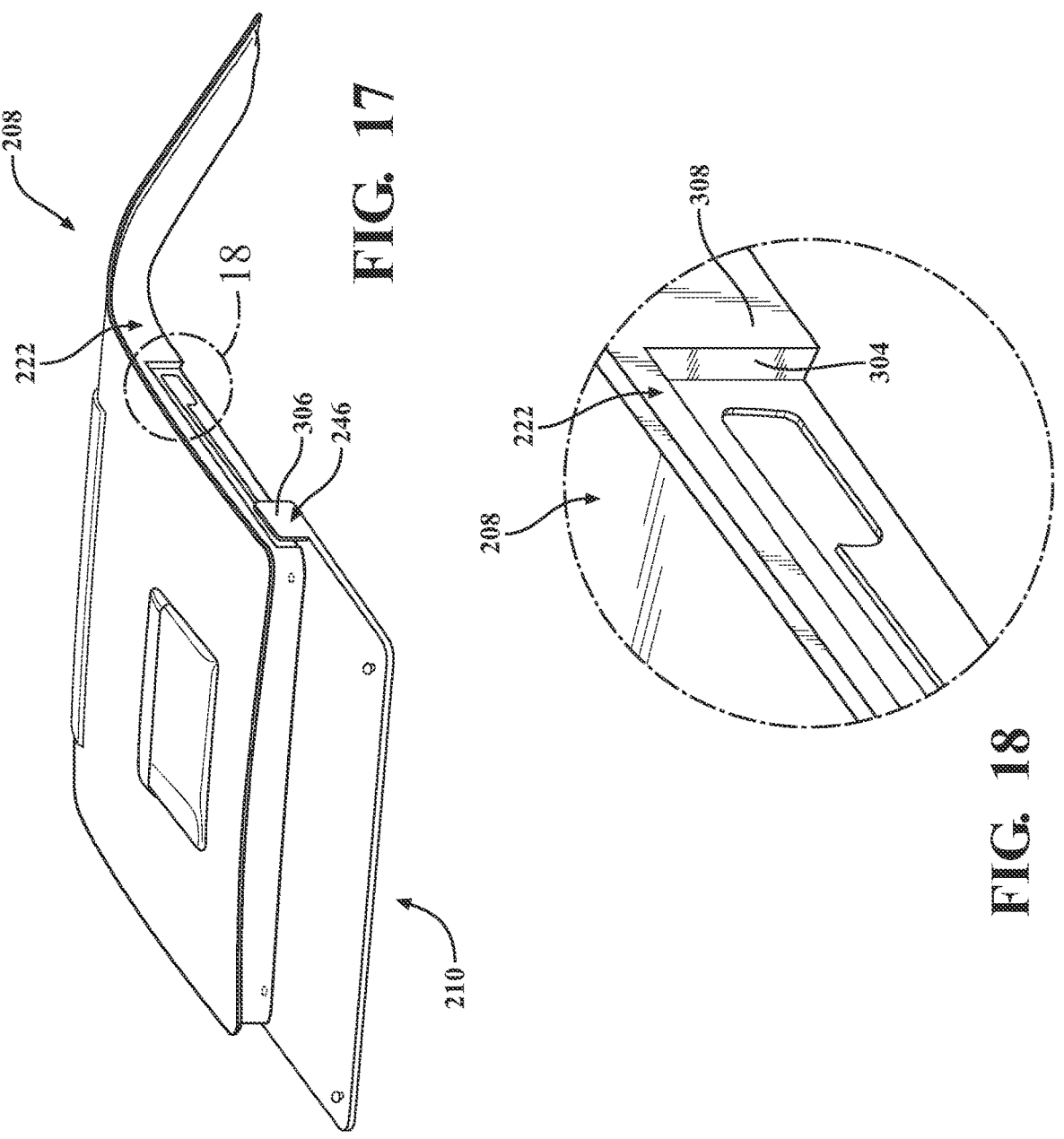
FIG. 17 is a rear, perspective view of an alternate embodiment of the tailgate and the shield seen in FIG. 12 with the shield shown in the deployed position.
FIG. 18 is an enlargement of the area of detail identified in FIG. 17.
Figures 19, 20:
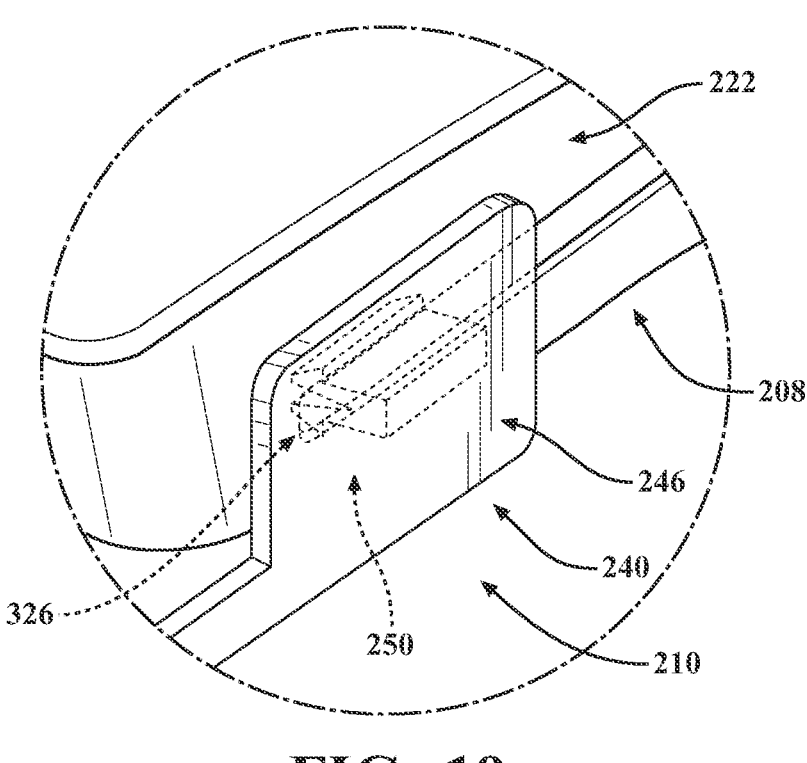
FIG. 19 is an enlargement of the area of detail identified in FIG. 14.
FIG. 20 is a partial, perspective view of the shield seen in FIG. 12.
Figure 21:
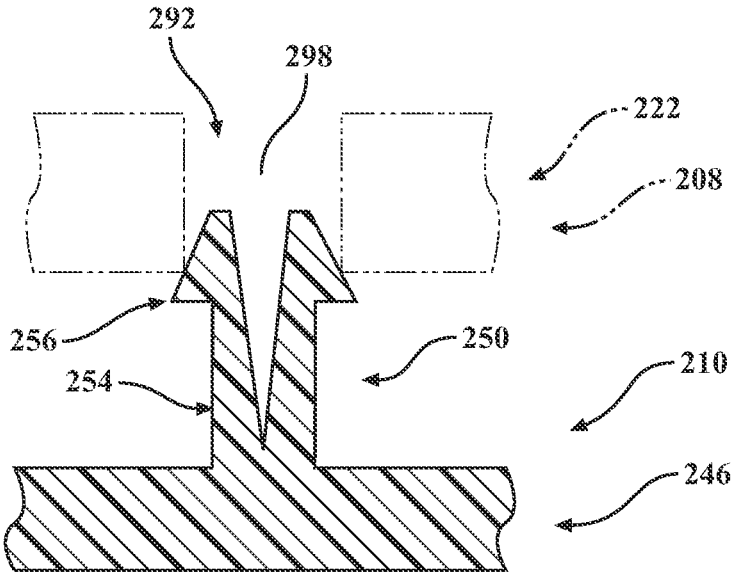
FIG. 21 is a partial, cross-sectional view of the shield seen in FIG. 20 shown prior to connection to the tailgate seen in FIG. 12.
Figure 22:
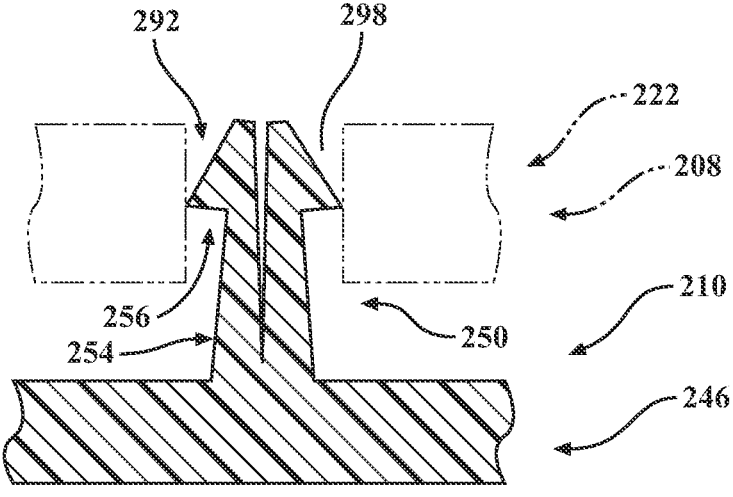
FIG. 22 is a partial, cross-sectional view of the shield seen in FIG. 20 shown during connection to the tailgate seen in FIG. 12.

As seen in FIGS. 14 and 19, for example, the shield 210 is configured such that the flanges 246 are positioned (laterally) outward of the door body 208 (e.g., the trim panel 222) along the width Wt (FIG. 6) of the tailgate 200. Embodiments are also envisioned, however, in which the door body 208 and the shield 210 may be configured such that the flanges 246 are (generally) flush-mounted with the door body 208. For example, FIGS. 17 and 18 illustrate an embodiment in which the door body 208 (e.g., the trim panel 222) includes cavities 304 that extend (laterally) inward (e.g., towards each other along the width Wt (FIG. 6) of the tailgate 200 and the centerline C thereof). The cavities 304 receive the flanges 246 and accommodate movement thereof during repositioning of the shield 210 between the stowed and deployed positions. More specifically, the cavities 304 are configured to receive the flanges 246 such that outer (lateral) surfaces 306 of the flanges 246 are (generally) coextensive (flush) with outer (lateral) surfaces 308 of the door body 208 (e.g., the trim panel 222).

Referring to FIGS. 19-23 in particular, the anchors 250 are supported by, and extend (laterally) inward from, the flanges 246 (e.g., along the width Wt (FIG. 6) of the tailgate 200 and towards the centerline C thereof). The anchors 250 are configured for (removable) insertion into the channels 292 so as to secure the shield 210 to the door body 208 and are axially movable therethrough during repositioning of the shield 210 between the stowed and deployed positions, as described in further detail below. The anchors 250 and each include a stem 254 and a head 256 having shoulders 310 that define (inner) contact surfaces 312.

The stems 254 define a (first) outer dimension D13, which is less than the inner dimensions D11, D12 (FIG. 16) respectively defined by the ingresses 298 and the guide portions 300 of the channels 292, and the heads 256 define a (second) outer dimension D14, which is larger than the outer dimension D13 and the inner dimensions D11, D12.

The stems 254 define a length Ls2 (FIGS. 20, 23) that is (approximately) equivalent to a thickness Tt1 (FIG. 23) of the door body 208 (e.g., the trim panel 222) adjacent to the channels 292. As such, upon insertion of the anchors 250 into the channels 292, the door body 208 (e.g., the trim panel 222) is captured (located, secured) between the heads 256 of the anchors 250 and the flanges 246, which secures the shield 210 in relation to the door body 208, as described in further detail below.

Figure 23:
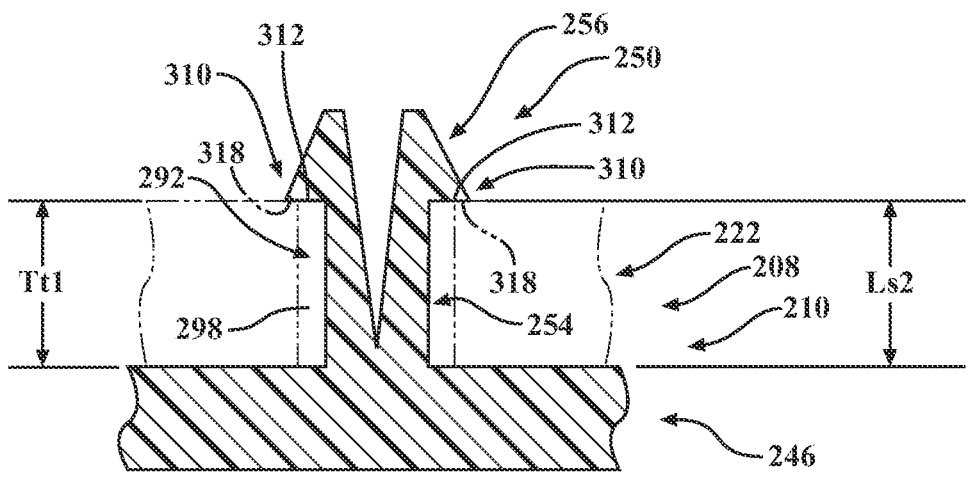
FIG. 23 is a partial, cross-sectional view of the shield seen in FIG. 20 shown upon connection to the tailgate seen in FIG. 12.

The anchors 250 are resilient in construction and include one or more flexible (deformable) materials, whether metallic or non-metallic, which facilitates insertion of the anchors 250 into the channels 292 (e.g., the ingresses 298) during connection of the shield 210 to the door body 208. More specifically, during connection of the shield 210 to the door body 208, the anchors 250 are reconfigured from an expanded (first, normal) configuration (FIGS. 19-21, 23) into a contracted (second, subsequent) configuration (FIG. 22), in which the anchors 250 are configured to secure the shield 210 within the channels 292, as seen in FIGS. 19 and 23. During movement into the contracted configuration, the anchors 250 are compressed radially in order to reduce the outer dimensions D14 (FIG. 20) defined by the heads 256 (e.g., such that the outer dimensions D14 are less than the inner dimensions D11 (FIG. 16)) and thereby facilitate insertion of the anchors 250 into the ingresses 298. Due to the resilient construction thereof, compression of the anchors 250 results in the creation of a biasing force that automatically returns the anchors 250 to their expanded configurations as the anchors 250 clear (are advanced (laterally) inward beyond) the ingresses 298, as seen in FIG. 23.

In order to facilitate reconfiguration of the anchors 250 from the expanded configuration into the contracted configuration, the anchors 250 include axial slots 314 (FIG. 20), which are (substantially) similar in both structure and function to the axial slots 174 (FIG. 10) discussed above in connection with the fasteners 152, and (outer) bearing surfaces 316, which are (substantially) similar in both structure and function to the aforedescribed bearing surfaces 176. The axial slots 314 extend towards the flanges 246 and into the heads 256 and the stems 254, and the bearing surfaces 316 extend (laterally) inward from the contact surfaces 312 (e.g., along the width Wt (FIG. 6) of the tailgate 200 and towards the centerline C thereof) and include tapered (chamfered, angled) configurations.

During connection of the shield 210 to the door body 208, as the anchors 250 are advanced (laterally) inward, the bearing surfaces 316 engage (contact) the trim panel 222 (e.g., adjacent to the ingresses 298 (FIG. 16)), which applies a compressive force to the anchors 250 that is directed radially inward. The compressive force constricts the axial slots 314, which reduces the outer dimensions D14 defined by the heads 256 so as to permit advancement of the anchors 250 through the ingresses 298, upon which, anchors 250 are automatically returned to their expanded configurations. Upon expansion of the anchors 250 within the channels 292, the shoulders 310 (e.g., the contact surfaces 312) are positioned adjacent to (e.g., in engagement (contact) with) inner surfaces 318 of the trim panel 222, which extend in (generally) parallel relation thereto. For example, in the illustrated embodiment, the door body 208 (e.g., the channels 292) and the shield (e.g., the anchors 250) are configured such that the shoulders 310 (e.g., the contact surfaces 312) frictionally engage the inner surfaces 318 of the trim panel 222, which secures (retains) the anchors 250 within the channels 292 and stabilizes the shield 210 during repositioning between the stowed and deployed positions. Additionally, the frictional engagement between the door body 208 and the shield 210 allows the shield 210 to be maintained in a variety of deployed positions without the need for any additional structure, components, etc.

Figure 24:
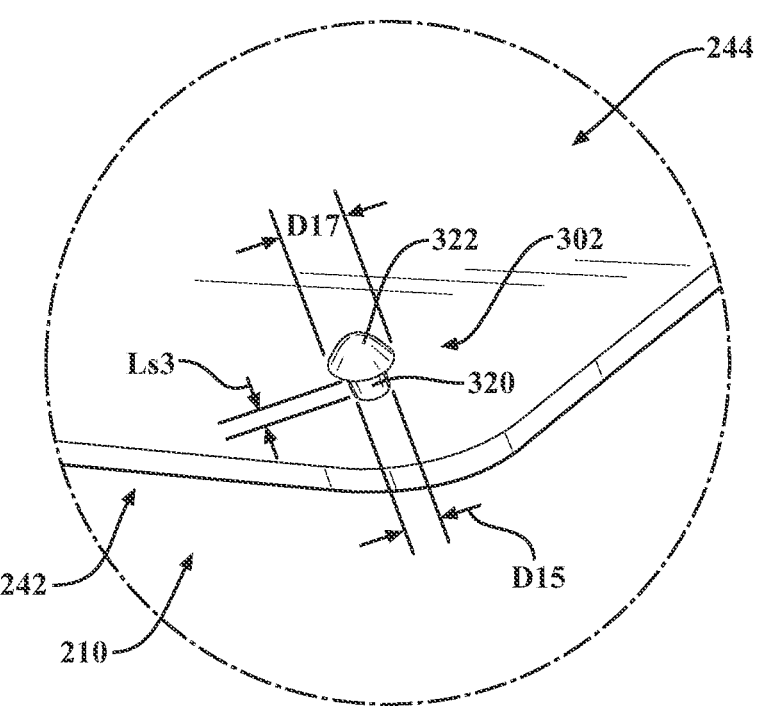
FIG. 24 is an enlargement of the area of detail identified in FIG. 14.

With reference now to FIGS. 14 and 24, the locking member(s) 302 will be discussed. The locking member(s) 302 are configured for engagement with the door body 208 and extend axially inward from the body panel 244 of the shield 210 (e.g., towards the door body 208 and along the depth Dt (FIG. 14) of the tailgate 200 in (generally) parallel relation to the axial dimension Lv (FIG. 2) of the vehicle 10). More specifically, the locking member(s) 302 are configured for (removable) insertion into the receptacle(s) 224 in order to inhibit (if not entirely prevent) movement of the shield 210 (e.g., in relation to the door body 208), as well as sagging of the shield 210, in the stowed position (FIG. 12).

The locking member(s) 302 correspond in location and number to the receptacle(s) 224 on the door body 208. For example, in the illustrated embodiment, the door body 208 and the shield 210 respectively include a pair of receptacles 224 and a corresponding pair of locking members 302. Embodiments of the present disclosure including both fewer and greater numbers of receptacles 224 and locking members 302 are also envisioned herein, however. For example, an embodiment in which the door body 208 and the shield 210 respectively include a single receptacle 224 and a single locking member 302 would not be beyond the scope of the present disclosure.

In the illustrated embodiment, the locking member(s) 302 are formed integrally (monolithically, unitarily) with the body panel 244, whereby the locking member(s) 302 and the body panel 244 are formed from a single piece of material such as, for example, via injection molding. CNC machining, etc. Embodiments are also envisioned, however, in which the locking member(s) 302 may be configured as discrete components of the shield 210 that may be connected to the body panel 244 in any suitable manner including, for example, via one or more mechanical fasteners (e.g., push-pins, bolts, screws, rivets, clips, etc.), via an adhesive, etc.

As seen in FIG. 24, each locking member 302 includes a stem 320 and a head 322. It should be appreciated, however, that the door body 208 and the shield 210 may be configured in any manner suitable for the intended purposes of inhibiting (if not entirely preventing) movement and sag of the shield 210 in the stowed position. For example, rather than the illustrated receptacle(s) 224 and locking member(s) 302, embodiments are envisioned in which the door body 208 and the shield 210 may include corresponding sections of hook-and-loop fastening material, clips, etc. Embodiments are also envisioned in which the receptacle(s) 224 and the locking member(s) 302, or any other such engagement features, may be eliminated altogether. In such embodiments, it is envisioned that the door body 208 and the shield 210 may be configured in order to maintain the stowed position of the shield 210, and inhibit (if not entirely prevent) sagging of the shield 210, solely via the frictional engagement between the shoulders 310 (e.g., the contact surfaces 312) and the inner surfaces 318 of the trim panel 222, as seen in FIG. 23, and the material(s) elected for use in construction of the shield 210.

Each stem 320 defines a (first) outer dimension D15 (FIG. 24), which is less than an inner dimension D16 (FIG. 14) defined by the receptacle(s) 224, and each head 322 defines a (second) outer dimension D17, which exceeds the inner dimension D16 and the outer dimension D15.

The stems 254 define an axial dimension Ls3 (e.g., a length) that is (generally) equivalent to a thickness Tt2 defined by the door body 208 (e.g., the trim panel 222) adjacent to the receptacle(s) 224. As such, upon insertion of the locking member(s) 302 into the receptacle(s) 224, the heads 322 engage (contact) inner walls 324 (FIG. 14) of the door body 208 (e.g., the trim panel 222), whereby the door body 208 is captured (located, secured) between the heads 322 and the body panel 244 of the shield 210 so as to secure the locking member(s) 302 within the receptacle(s) 224 and thereby secure the shield 210 in relation to the door body 208 when the shield 210 is in the stowed position.

The relative dimensioning between the locking member(s) 302 and the receptacle(s) 224 facilitates removable insertion of the locking member(s) 302 into the receptacle(s) 224 in an interference fit (e.g., a snap fit, a press fit), which supports repositioning of the shield 210 between the stowed position (FIG. 12) and the deployed position (FIG. 13). More specifically, insertion of the locking member(s) 302 into the receptacle(s) 224 secures the shield 210 in the stowed position until the protection offered by the shield 210 is necessary or desired, at which time, the locking member(s) 302 can be removed from the receptacle(s) 224 to allow for repositioning of the shield 210 from the stowed position into the deployed position.

It is envisioned that the materials used in construction of the locking member(s) 302 and/or the door body 208 (e.g., the trim panel 222) may be elected so as to support reception of the locking member(s) 302 by the receptacle(s) 224 in the aforementioned interference fit. For example, it is envisioned that the elected materials may impart sufficient flexibility to the locking member(s) 302 and/or the receptacle(s) 224 to allow the locking member(s) 302 and/or the receptacle(s) 224 to deform (e.g., bend, compress, flex, etc.) during insertion of the locking member(s) 302 into, and removal of the locking member(s) 302 from, the receptacle(s) 224 in the manner described above.

Additionally, while the locking member(s) 302 and the receptacle(s) 224 are respectively shown as being provided on the shield 210 and the door body 208, embodiments are envisioned in which the locations of the locking member(s) 302 and the receptacle(s) 224 may be reversed (e.g., such that the locking member(s) 302 and the receptacle(s) 224 are provided on the door body 208 and the shield 210, respectively).

With reference now to FIGS. 12-16 and 19-24, use of the tailgate 200 and the shield 210 will be discussed.

Initially, with the tailgate 200 in the open position (FIG. 2), the shield 210 is repositioned from the stowed position (FIG. 12) into the deployed position (FIG. 13) by removing the locking member(s) 302 (FIG. 14) from the receptacle(s) 224 by bending (deflecting) the body panel 244 of the shield 210 (axially) inward (e.g., away from the door body 208 and along the depth Dt (FIG. 14) of the tailgate 200). Upon removal of the locking member(s) 302 from the receptacle(s) 224, force is (manually) applied to the shield 210 in order to slide the shield 210 in relation to the door body 208 in a first direction 5 (FIG. 14) (e.g., away from the upper end 104 of the tailgate 200), during which, the anchors 250 (FIGS. 19, 20) move through the channels 292. Sliding of the shield 210 in the first direction 5 continues until the shield 210 is positioned as desired, or until the anchors 250 engage (contact) the lower ends 296 of the channels 292, which provides a (first) hard stop 326, as seen in FIG. 19.

When use of the shield 210 is no longer desired, the shield 210 can be returned to the stowed position via the (manual) application of force to the shield 210 in a second direction 6 (FIG. 14) (e.g., towards the upper end 104 of the tailgate 200). Sliding of the shield 210 continues until the locking member(s) 302 are aligned with the receptacle(s) 224, upon which, the locking member(s) 302 can be inserted into the receptacle(s) 224 to thereby secure the shield 210 in the stowed position. In order to facilitate proper alignment of the locking member(s) 302 and the receptacle(s) 224, it is envisioned that sliding of the shield 210 in the second direction 6 may continue until the anchors 250 engage (contact) the upper ends 294 of the channels 292, which provides a (second) hard stop 328, as seen in FIG. 16.

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 182°±25% (e.g., an angle that lies within the range of (approximately) 135° to (approximately)) 225° and the term "generally orthogonal" should be understood as referring to configurations in with the pertinent components are oriented so as to define an angle therebetween that is equal to 90°±25% (e.g., an angle that lies within the range of (approximately) 67.5° to (approximately)) 112.5°. The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A tailgate for a vehicle, the tailgate comprising:
   a door body; and
   a shield connected to the door body such that the shield is manually repositionable between a stowed position, in which the shield is concealed by the door body, and a deployed position, in which the shield is exposed from the door body, wherein the shield is configured to mechanically engage the door body to thereby secure the shield in the stowed position.

2. The tailgate of claim 1, wherein the shield is pivotably connected to the door body.

3. The tailgate of claim 2, wherein the shield is biased towards the deployed position.

4. The tailgate of claim 3, wherein the door body defines a receptacle, and the shield includes an anchor configured for removable insertion into the receptacle to thereby secure the shield in the stowed position.

5. The tailgate of claim 4, wherein the receptacle and the anchor are configured for engagement in an interference fit.

6. The tailgate of claim 4, wherein the tailgate further includes:
   a fastener connected to the shield and extending into the door body such that the shield is pivotable about a pivot axis extending through the fastener; and
   a biasing member including a first end secured to the fastener and a second end in engagement with the door body, the biasing member applying a biasing force to the fastener such that, upon removal of the anchor from the receptacle, the shield is automatically repositioned from the stowed position into the deployed position.

7. The tailgate of claim 1, wherein the shield is slidably connected to the door body such that the shield is axially movable along a length of the tailgate during repositioning between the stowed position and the deployed position.

8. The tailgate of claim 7, wherein the door body defines channels extending in generally parallel relation to the length of the tailgate, and the shield includes anchors extending into the channels.

9. The tailgate of claim 8, wherein the anchors are resilient in construction and are reconfigurable between a contracted configuration, in which the anchors are configured for insertion into the channels, and an expanded configuration, in which the anchors are configured to secure the shield within the channels.

10. The tailgate of claim 8, wherein the shield further includes a locking member configured for engagement with the door body to thereby inhibit movement of the shield in the stowed position.

11. A tailgate for a vehicle, the tailgate comprising:
    a door body defining a receptacle; and
    a shield pivotably connected to the door body about a pivot axis such that the shield is repositionable between a stowed position, in which the shield extends forwardly of the pivot axis, and a deployed position, in which the shield extends rearwardly of the pivot axis, the shield including an anchor configured for removable insertion into the receptacle to thereby secure the shield in the stowed position.

12. The tailgate of claim 11, wherein the tailgate further includes:
    a fastener connected to the shield and extending into the receptacle such that the fastener is rotatable in relation to the door body; and
    a biasing member extending between the fastener and the door body, the biasing member applying a rotational biasing force to the fastener such that the shield is biased towards the deployed position.

13. The tailgate of claim 12, wherein the biasing member is configured as a torsion spring.

14. The tailgate of claim 12, wherein the biasing member extends about the fastener, the biasing member including a first end secured to the fastener and a second end in engagement with the door body.

15. The tailgate of claim 12, wherein the anchor and the fastener extend in generally parallel relation.

16. A tailgate for a vehicle, the tailgate comprising:
    a door body defining channels extending laterally into the door body towards a centerline of the tailgate; and
    a shield slidably connected to the door body such that the shield is axially movable through the channels during repositioning between a stowed position, in which the shield is concealed by the door body, and a deployed position, in which the shield is exposed from the door body, the shield including anchors extending laterally into the channels to thereby secure the shield to the door body.

17. The tailgate of claim 16, wherein the shield is received by cavities defined by the door body such that outer surfaces of the shield are generally flush with outer surfaces of the door body.

18. The tailgate of claim 16, wherein the channels each include a non-uniform configuration.

19. The tailgate of claim 18, wherein the channels include ingresses defining first inner dimensions and guide portions extending from the ingresses and defining second inner dimensions less than the first inner dimensions.

20. The tailgate of claim 19, wherein the anchors are reconfigurable between an expanded configuration, in which the anchors define outer dimensions larger than the first inner dimensions defined by the ingresses, and a contracted configuration, in which the outer dimensions defined by the anchors are less than the first inner dimensions defined by the ingresses, whereby reconfiguration of the anchors from the expanded configuration into the contracted configuration facilitates insertion of the anchors into the ingresses and reconfiguration of the anchors from the contracted configuration into the expanded configuration secures the anchors within the channels.

* * * * *